United States Patent

Moir

[15] 3,668,065
[45] June 6, 1972

[54] APPARATUS FOR THE CONVERSION OF HIGH TEMPERATURE PLASMA ENERGY INTO ELECTRICAL ENERGY

[72] Inventor: Ralph W. Moir, Livermore, Calif.
[73] Assignee: The United States of America as represented by the United States Atomic Energy Commission
[22] Filed: Sept. 15, 1970
[21] Appl. No.: 72,294

[52] U.S. Cl. ..................................176/3, 176/1, 310/10, 310/11, 310/3
[51] Int. Cl. ..............................................G21b 1/00
[58] Field of Search..................176/1, 3; 310/5, 6, 10, 11, 310/3

[56] References Cited

UNITED STATES PATENTS

| | | | |
|---|---|---|---|
| 2,580,021 | 12/1951 | Hart | 310/3 R |
| 3,462,622 | 8/1969 | Cann et al | 310/11 |
| 3,500,077 | 3/1970 | Post | 310/11 |
| 3,569,751 | 3/1971 | Ruhnke | 310/11 |

FOREIGN PATENTS OR APPLICATIONS 894,848  4/1962  Great Britain..........................126/1

*Primary Examiner*—Reuben Epstein
*Attorney*—Roland A. Anderson

[57] ABSTRACT

High temperature plasma is produced in a controlled thermonuclear reactor and a plasma beam is directed therefrom through an expander having a decreasing intensity magnetic field to provide an ion beam in which the ions have substantially only translational kinetic energy. The ions of the beam are then directed, by application of an E × B field, into an offset collector system having collectors arranged in a zig-zag pattern while the electrons are separated from the ions. The collectors situated in an E × B field have progressively lower retarding potentials applied thereto so that ions having a kinetic energy exceeding that of a particular stage are collected in successively lower energy groups to produce an electrical current therein. An advantage is obtained in that ions in a beam having a wide energy spread are collected at an electrode where there is a low energy differential between the effective retarding potential of the particular collector electrode and the group of energetic ions collected thereat making for efficient conversion of the kinetic energy of the particles into electrical energy.

10 Claims, 7 Drawing Figures

INVENTOR.
Ralph W. Moir

INVENTOR.
Ralph W. Moir
BY
ATTORNEY.

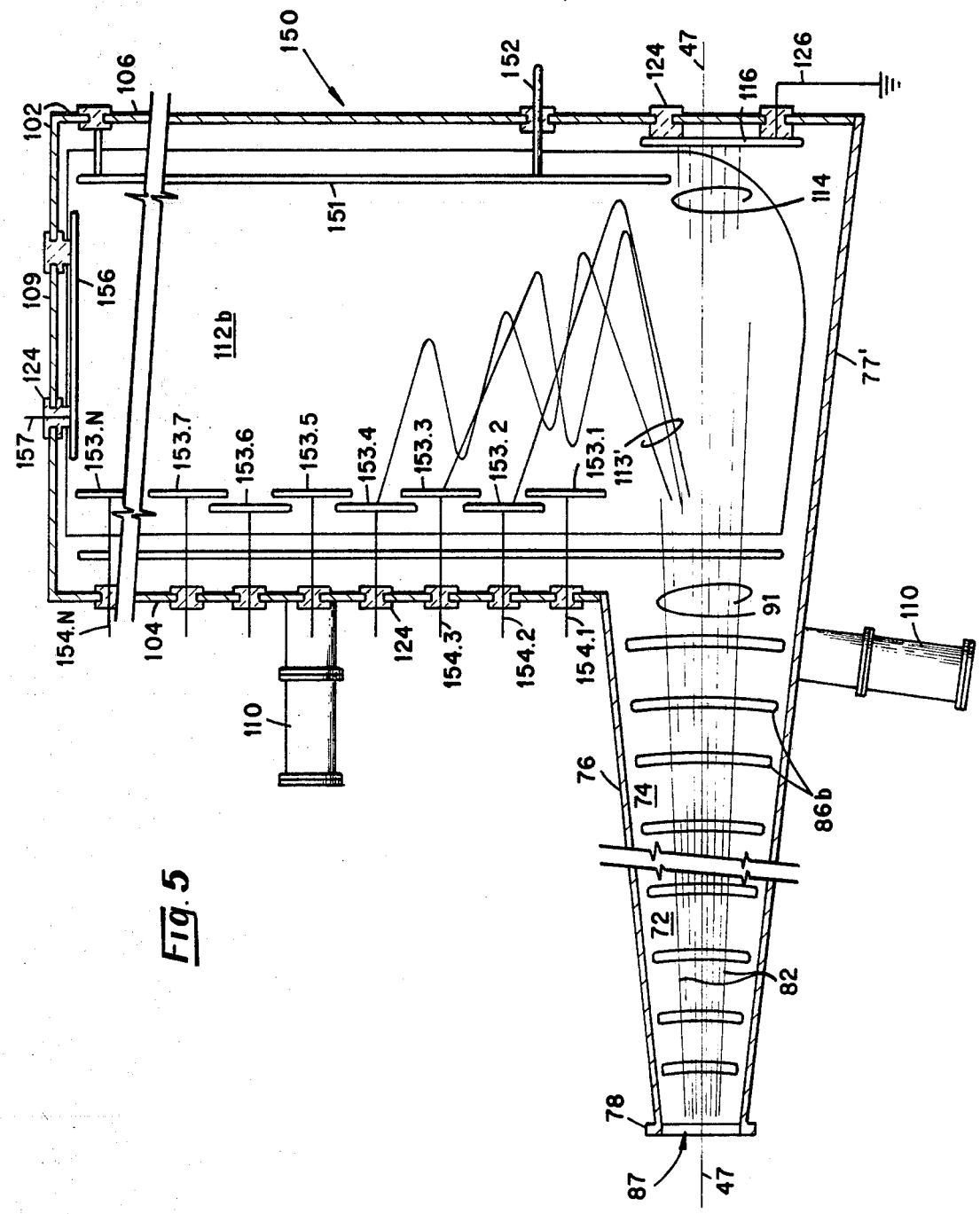

APPARATUS FOR THE CONVERSION OF HIGH TEMPERATURE PLASMA ENERGY INTO ELECTRICAL ENERGY

BACKGROUND OF THE INVENTION

This invention was made under or in the course of Contract No. W-7405-ENG-48 with the United States Atomic Energy Commission.

Plasma or ion beams including charged particle components having a high kinetic energy are produced by a variety of devices or a variety of devices can be modified to produce such beams. For example, controlled fusion devices utilize systems in which a considerable volume of high temperature plasma is accumulated or is produced in a containment zone defined within a magnetic field. Under proper conditions, with certain fusionable isotopes being present therein, fusion reactions can occur with an accompanying large output of various forms of energy, i.e., thermal, radiative and kinetic energy resident in energetic particles. With certain fuels or fuel mixtures a preponderance of the energy appears in the form of charged particle kinetic energy. Interrelated conditions generally considered necessary for fusion reactions to occur include fuel particle densities of the order of $10^{14}$ to $10^{18}$ particles/cc, plasma temperatures of the order of 5 KeV to above about 500 KeV and commensurate confinement times of above about 0.05 seconds using fusionable light nuclides such as protons ($P^+$), deuterons ($D^+$), tritons ($T^+$), helium-3 ($He_3^+$) alone or in appropriate admixture. Various cyles, blanket arrangements, heat exchangers, and the like, have been proposed for recovering thermal and radiative energy components of the output power as well as for recovering the kinetic energy of the energetic neutrons produced in the reaction. With certain of the reactions the proportion of the output energy, appearing in the form of charged particle kinetic energy, approaches 100 percent. Efficiencies of thermal cycle conversion of the output energy generally lie below about 40 percent as dictated by Carnot cycle limitations. However, the charged particles are effectively at a very high temperature of the order of $10^8$ to $10^9$ °K, $T_f$. Therefore, with a 300°K, To heat rejection temperature, the Carnot efficiency $N_o = 1 - T_o/T_f \cong 1 - 3 \times 10^{-6}$ or above 99 percent as a theoretically possible recovery efficiency for a system, e.g., in which the kinetic energy of the charged particles as converted directly and efficiently into electrical energy.

With such a system the efficiency of usual controlled fusion reactor systems could be improved by recovering charged particle product kinetic energy, and/or at least some of the energy expended in producing the heated plasma. By using a fuel mixture, in which essentially all or a selected proportion of the output energy resides in the kinetic energy of charged particle products, the need for a thermal cycle could be eliminated or at least greatly reduced. One category of such a direct recovery system is disclosed in the copending application of Richard F. Post, entitled "Conversion of High Temperature Plasma Energy into Electrical Energy," Ser. No. 63,582 filed Aug. 13, 1970. In such application a plasma beam, delivered from the magnetic containment zone of a controlled fusion reactor, is passed through a decreasing intensity magnetic field in an expander section to convert rotational energy, $W\perp$, thereof to translational energy, $W\|$; electrons are separated from the beam; and the resultant ion beam is then directed into a collector system including a sequence of collector stages having progressively higher retarding potentials therein and provided with means for effecting selection of low residual energy ions in the successive stages, so that the ions are collected at a collector electrode to produce an electrical current with high efficiency.

SUMMARY OF THE INVENTION

The present invention relates, in general, to the conversion of the kinetic energy of energetic charged particles into electrical energy and, more particularly, to the direct conversion of the kinetic energy of high temperature plasma particles, such as that of controlled fusion reaction charged particle products, into electrical energy.

In summary, the invention contemplates the recovery of the energy of energetic charged particles from an ion beam produced by any suitable means. In practice the means for producing the ion beam may be a controlled fusion reactor generally including means such as electromagnetic coil structures for producing a magnetic field in an evacuated region to define a containment zone for charged particles therein. A controlled fusion plasma may be produced therein by a variety of known methods generally involving introduction of a fusionable light isotope fuel as well as the ionization, heating, densification, or the like thereof as appropriate to provide conditions suitable for inducing a fusion reaction involving the fusionable light nuclides. Charged reaction products, unreacted fuel particles and other energetic particles tend to escape from such containment zones along certain preferential paths, e.g., through magnetic mirror field regions or such preferential escape can be arranged by manipulation or modification of the magnetic field, thereby providing a plasma beam suitable for practice of the present invention.

As disclosed in the above-identified application of Richard F. Post, the kinetic energy, W, of the charged particles in the plasma beam emerging from the containment zone have kinetic energies covering a wide range in the form of rotational component, $W\perp$, as well as a translational component, $W\|$. For most efficient energy conversion the, $W\perp$, component must be converted into, $W\|$, energy, e.g., by passage through an expander vacuum vessel section in which a decreasing intensity magnetic field is provided so that substantially all of the rotational kinetic energy of the plasma ions is transformed into translational kinetic energy directed along the beam path. The decreasing intensity magnetic field is created by electrical conductors disposed in transverse spaced parallel relation above and below the beam path in the expander section and producing a magnetic field, B, directed along the beam path. The translational energy of the plasma particles covers a wide range.

In accordance with the present invention positive ions of such a plasma beam, in which the kinetic energy has at least a substantial component of or, preferably, substantially only a translational kinetic energy component, are selectively deflected angularly away from the electrons in the plasma beam by application of an E × B field yielding a positive ion beam. Such a field can be created by disposing plate electrodes in spaced parallel relation above and below the ion beam path and by applying an electrostatic potential between said electrodes to establish an E-field ($\downarrow$E) perpendicular to the beam path. The conductors which create the B-field in the expander may be extended along the beam path in spaced relation outwardly from the E-field plate electrodes to produce a B-field ( $\rightarrow$ B) extending along the ion beam path therebetween thereby creating said E × B field.

The positive ion beam, deflected angularly away from the plasma beam and residual electron beam path, is directed into a collector system disposed in offset relation to the original plasma beam and residual electron beam paths by an extension of said E × B field provided by angular extensions of said conductors and E-field plate electrodes. The collector system comprises at least one array comprising a plurality of collector plate electrodes arranged in spaced parallel rows between the extensions of said E-field electrodes and perpendicular with respect thereto providing a pathway or channel therebetween which is to be traversed by the deflected ions. The collector plate electrodes are energized with a positive retarding potential beginning with a selected high magnitude in the entrance region and progressively decreased in selected increments along said collector channel.

The orientation of such collector plate arrays is arranged such that the deflected ions are directed toward a first highest retarding potential collector electrode whereat those having a kinetic energy inadequate to overcome the retarding potential rebound along a zig-zag path along said collector channel to successively approach the collectors arranged in rows on each side thereof. Whenever the kinetic energy of a particular ion exceeds that needed to overcome the retarding potential of a particular collector electrode the ion impinges upon the collector electrode to combine an electron to produce electrical current. With such arrangement the ions of the ion beam are caused to sample a series of decreasing retarding potential collectors to finally select a collector at a potential corresponding nearly to the kinetic energy thereof at which it is collected to create electrical current with little loss. It will be appreciated that a particle impinging on a collector without such a retarding potential expends the kinetic energy, in excess of any retarding potential thereover, in the form of heat, radiation, etc. With the present arrangement, the wide range of particle kinetic energies in the ion beam is efficiently converted into electrical energy albeit at a series of progressively decreasing potentials.

The magnitude of the retarding potentials and number of stages utilized is determined primarily by the range of particle kinetic energies in the ion beam and the efficiency desired. More particularly, the retarding potential of the first collector stage is set below that required to repel a selected fraction of the most energetic particles in the beam. In this fashion particles having an energy, above that effectively repelled, impinge upon a collector electrode to generate electrical current at the potential of the stage. The residual lower energy particles are repelled and reflected to approach the second sequential collector stage, which being set at a lower retarding potential similarly allows the highest energy fraction to impinge upon a collector electrode to generate electrical current at the lower potential of such stage. Again, as above, lower residual energy charged particles are repelled and reflected toward the third sequential collector stage. The procedure is repeated throughout the collector system with the retarding potential of the last stage being set just below that which would repel the lowest energy particle which is to be collected. Means are also provided for applying the retarding potential and for removing and distributing the electrical current generated in the collector system.

Accordingly, it is an object of the invention to provide a device for directly converting the kinetic energy of energetic charged particles into electrical energy.

Another object of the invention is to provide means for directly converting the energy of charged particles of a high temperature plasma into electrical energy.

Still another object of the invention is to provide a controlled fusion reactor with means for converting the kinetic energy of charged particles emerging from a magnetically confined plasma therein directly into electrical energy.

A still further object of the invention is to employ a collector system comprising a plurality of sequential collector stages maintained at progressively diminishing retarding potentials for sorting out charged particles, from a beam passed therethrough, into fractions having energies corresponding to a collector upon which the fraction of particles is collected to generate an electrical potential therein.

Other objects and advantageous features of the invention will be apparent in the following description taken in conjunction with the accompanying drawing, of which:

FIG. 5, is a horizontal sectional view similar to that of FIG. 4 showing details of a second collector embodiment;

Figure 1:
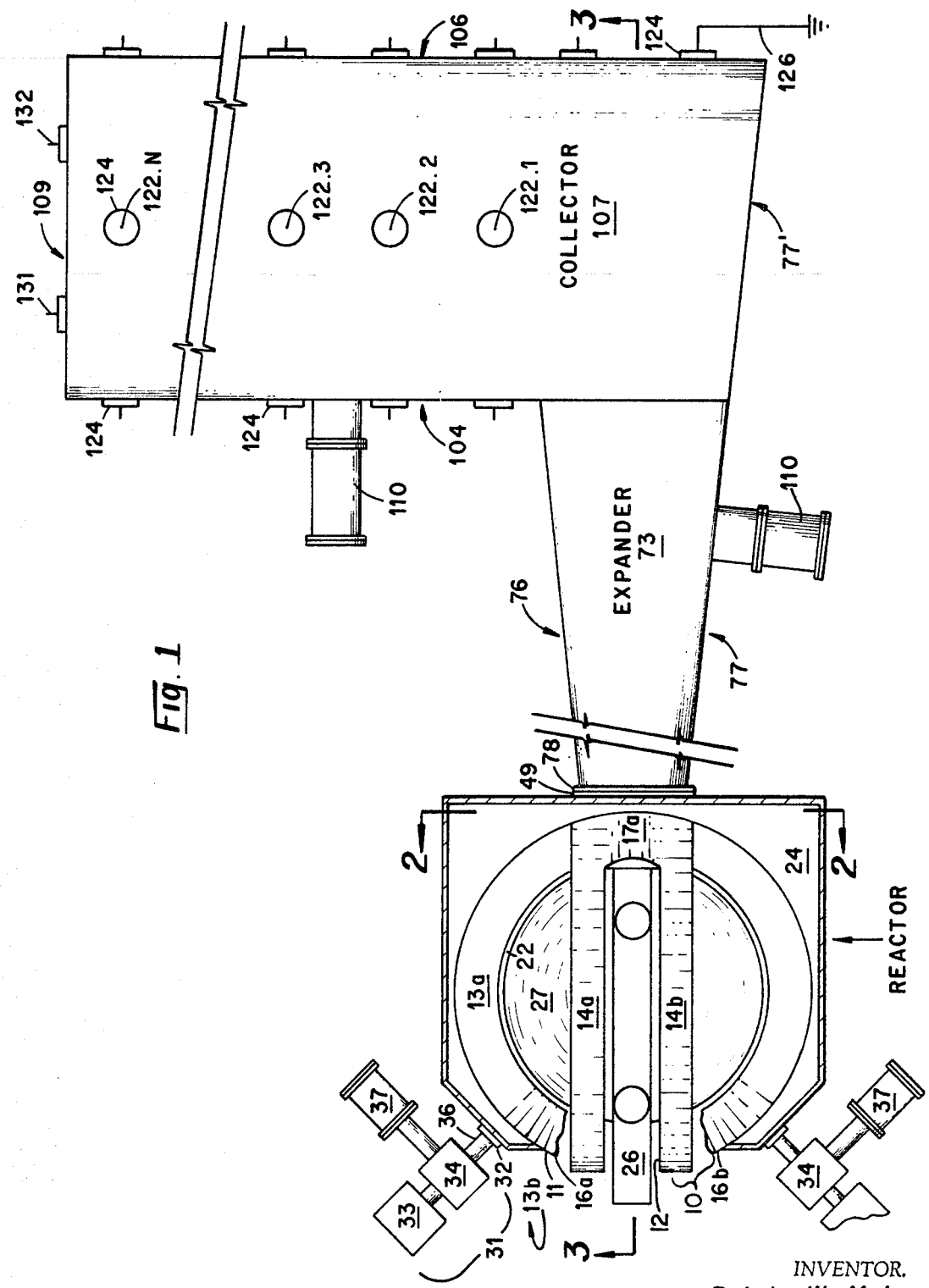
FIG. 1, is a plan view of a controlled fusion device for producing a high temperature plasma as adapted to include expander and collector components for the direct conversion of plasma kinetic energy into electrical power.

The principles of the invention can be applied to the conversion of the kinetic energy of the particles of any type of high temperature plasma and is particularly adapted to the efficient conversion of such energy from a high temperature plasma in which the kinetic energy of the particles have a distribution covering a wide range of energies. It is generally preferred that the source of the high temperature plasma, e.g., a controlled fusion reactor or device, deliver or that the particles escape therefrom as a stream or beam of energetic plasma particles along a preferentially defined pathway or that the plasma source be adaptable to deliver such particles along such a preferential pathway. Such a preferential escape or emission pathway is characteristically provided by "magnetic mirror" portions of the magnetic containment fields or other "open-ended" regions in controlled fusion reactors. Magnetic mirror field regions are generally characterized by a gradientially increased magnetic field intensity, i.e., the field lines tend to converge toward a line or surface proceeding from an inner, i.e., containment zone to a mirror peak field region. The magnetic field lines diverge in exterior "fringing portions" of the field. The plasma particles emitted or escaping from the containment zone tend to follow such field lines and to escape along a pathway including the line or surface of convergence. Examples of such "magnetic mirror" fusion devices include the so-called "Pyrotron" which uses a containment field generally having a centrally axially symmetric containment zone of uniform intensity with terminal gradientially intensified "magnetic mirror" field regions. Particles escaping from such a containment zone tend to follow preferential pathways, of columnar or diverging conical configurations, axially through the mirror field regions. With other type mirror fields, e.g., a radial mirror field region such as exists in "cusp," minimum B or multipoloidal spherical containment field systems, sheet-like or fan-like beams may be produced. The latter spherical configurations are represented by so-called baseball seam electromagnet devices and by the so-called "Yin-Yang" electromagnet coil device described more fully hereinafter. However, the electromagnets of such devices can be modified to produce narrow beams as described hereinafter.

Thermonuclear fusion reactions which yield energetic charged particle products, the kinetic energy of which can be utilized for electrical current generation, include the following:

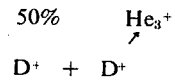

$$D^+ + D^+$$

$$50\% \rightarrow T$$

If the reaction is continuous, the He³ and T react further as follows:

D + T → He₄⁺ (3.52 Mev) + N (14.06 Mev) (17.6 Mev)
D + He₃⁺ → He₄⁺ (3.67 Mev) + P⁺ (14.7 Mev) (18.4 Mev)
or totaled
6 D⁺ → 2 He₄⁺ + 2P⁺ + 2N + 43.2 Mev
Li⁶⁺ + P⁺ → He₃⁺ + He₄⁺ + 4 Mev The latter two reactions (above) can also be used, e.g., by injecting 50:50 mixtures of D and T or D and He³ while the DHe³ reaction is seen to yield only charged reaction products, i.e., an energetic alpha particle and an energetic proton. Per deuterium reacting in the overall reaction 4.43 Mev of energy appears in the form of charged particles (He³⁺, He⁴⁺, T⁺ and P⁺) while the neutrons carry off about 2.76 Mev of the energy. Deuterium can also be used, e.g., with 10—30 percent (20 percent typically) $He_3$ in a breeding cycle productive of $He_3$. $He_3$ is added initially and the amount added from an external source may be reduced as the $He_3$ produced in the reaction builds up.

A discussion of some of the many various possible reactions and fuel cycles which can be utilized in a controlled fusion reaction is set forth in pages 59–100, "Plasma Physics and Thermonuclear Research," Vol. 2, Longmire, Tuck and Thompson, Progress in Nuclear Energy, Series XI.

PLASMA SOURCE-FUSION REACTOR

Figure 2:
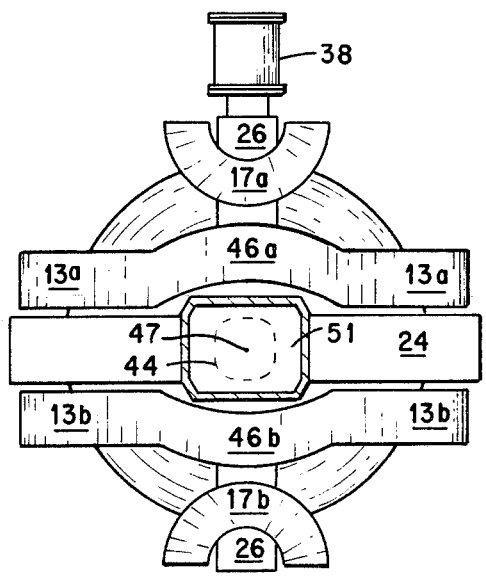
FIG. 2, is a transverse vertical sectional view taken along the plane 2—2 of FIG. 1 showing details of the construction in the beam exit region of the reactor portion of the apparatus of FIG. 1.
Figure 3:
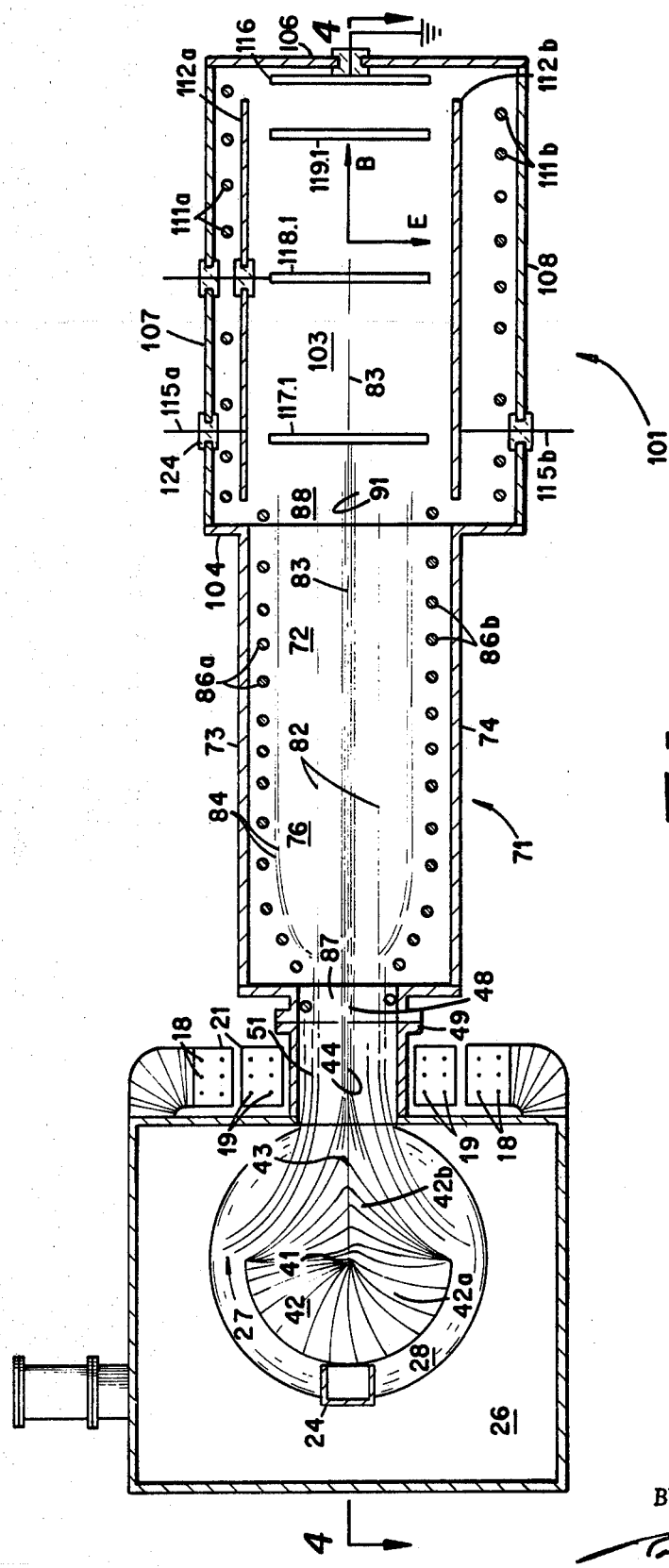
FIG. 3, is a longitudinal vertical sectional view taken along plane 3—3, of the reactor expander and collector entrance portions of the apparatus of FIG. 1.

For purposes of describing the invention illustrative reference will be made to the production of electrical energy using a quadrupole magnetic field pattern type fusion reactor employing a so-called "Yin-Yang" electromagnetic field coil of the type disclosed in the copending application of Richard F. Post and Ralph W. Moir, entitled "Electromagnetic Apparatus for Producing and Containing High Temperature Plasmas," Ser. No. 881,787, filed Dec. 3, 1969. See Also: " 'Yin-Yang' Minimum | B | Magnetic Field Coils," R. W. Moir, R. F. Post, "Nuclear Fusion" 9, 1969, pp. 253–258. Baseball seam electromagnetic coils, quadrupole and other systems can be used similarly. Such a Yin-Yang electromagnetic coil 10, as illustrated in FIGS. 1 and 2 of the drawing, includes a pair of similar C-shaped, coil segments 11 and 12, each of which includes a pair of spaced parallel sectors, i.e., 13a, 13b, 14a, 14b, respectively. Corresponding open ends of the sectors 13a, 13b, 14a and 14b are joined by transverse curved end portions 16a, 16b, 17a, 17b, respectively. In usual practice, the coil segments are wound unidirectionally with a continuous individual conductor 18 and 19 as shown in FIG. 3. The Yin-Yang coil segments may enclose a generally spheroidal volume as shown in FIGS. 1 and 2 or the coil sections can be elongated in one dimension to define oblate spheroidal or generally cylindrical volumes. For economic reasons, cryogenic or superconductor windings may be used alone or in combination to attain the necessary containment field intensity. The coil segments 11, 12 may be constructed with a casing 21 of magnetically permeable material, e.g., aluminum, non-magnetic stainless steel or the like, to provide support with the conductors being disposed in layers therein. Dependent upon the type of conductor utilized, the space between the conductors includes electrical insulation, spacers, if cryogenic cooling is used, and thermal insulation as in conventional practice. For cooling, the conductors may be hollow to allow circulation of a coolant therethrough from an exterior heat exchanger, etc. (not shown) or a coolant, e.g., cryogenic, may likewise be circulated by any appropriate or conventional means (not shown). Upon assembly the coil segments 11, 12 are arranged in a 90° rotated intersecting mirror image relation so that the curved end portions 16a, 16b and 17a, 17b are disposed facing across pair sectors 14a, 14b and 13a, 13b, respectively, in a symmetrical configuration. With such a configuration, the coil segments enclose a generally spheroidal volume 22.

A vacuum vessel may be provided in the form of a pair of rectangular boxlike portions 24, 26, inserted between the spaced parallel coextensive sectors 13a, 13b and 14a, 14b, respectively, in an intersecting relationship. Appropriately shaped shell members 27, e.g., spherical, cylindrical, or the like, segments, may be joined to the intersecting members, substantially approximating the peripheral dimensions or the spherical volume 22, to define a substantially spheroidal vacuum chamber 28 therein. The rectangular vessel portions define a vacuum chamber communicating therewith to which access may be gained through side or end portions of the rectangular box members which ends project beyond the coil sectors. If desired, energy multiplying blankets, breeding blankets, heat exchange arrangements, heat shields and the like (not shown) may be arranged within the volume 22 and/or chamber 28, adjacent the vessel walls, out of contact with the plasma formed as described hereinafter. The coil segments may be positioned within a rigid supporting framework (not shown) with provision, e.g., of clamping bolts (not shown) to offset the expansive forces produced by the magnetic field. Moreover, the coil segments can be enclosed in a rigid composite body (not shown), e.g., fiber reinforced laminating plastic or the like which can be made vacuum tight and evacuated to provide a "rough" vacuum below about 1 mm Hg to relieve the atmospheric pressure load on the vacuum vessel. The entire assemblage could also be enclosed in a large exterior vessel structure (not shown) similarly evacuated and which could be constructed, e.g., of prestressed concrete to provide radiation shielding if needed.

At least one source 31 is arranged to direct a beam of eneretic neutral or molecular ion particles into central portions of spheroidal vacuum chamber 28, for example, through a port 32 located at an accessible corner of the rectangular box section 24 and/or 26, or in vessel shell members 27. Such a source, for injecting energetic neutral particles may include an ion source 33 directing ions such as $H_1^+$, $D^+$, $T^+$, $He_3^+$, $Li^+$ or various molecular ion combinations such as $D_3^+$, $He_3D^+$, etc., through a neutralizer-purifier-collimator arrangement 34 to produce corresponding energetic neutral particles which are directed along a beam guide tube 36 and through port 32 as indicated above. The arrangement 34, in accord with conventional practice, may comprise vapor streaming neutralizer cells, beam collimators, baffles, at least one diffusion pump 37, a magnet coil arranged to deflect unneutralized ions from the beam, together with close-off valves and the like (not individually shown) as described, for example, in an article entitled "Cooperative Effects in a Tenuous Energetic Plasma Contained by a Magnetic Mirror Field" C. C. Damm et al., Physics of Fluids, Volume 8, No. 8, August 1965, pp. 1,472–1,488. The neutral particle beams comprise energetic neutral fusionable isotope particles such as $H_1$, D, T, $He^3$, $Li^6$, alone or in admixture as appropriate for the fusion reaction desired.

If a D-D reaction is used, for example, the sources 31 may be arranged to inject D particles alone; however, if a (DT), (DHe$^3$), or (PLi$^6$) reaction is used, one set of sources might inject energetic D or P particles while another set would then inject T, $He_3$ or Li particles, respectively. The energy of the particles may range upward from about 1 Kev, for example, at the beginning of injection to as high, e.g., up to 200 Kev to 500 Kev, as necessary to attain a suitable reaction rate; that is, as the plasma density builds up, the energy of the injected particles may be increased to yield a plasma having a temperature appropriate to the desired fusion reaction rate. Such temperatures generally lie in the range of from about 30 Kev, e.g., with DT reactions or DHe$_3$, up to about 500 Kev. Temperatures in the range of 200 Kev to 700 Kev may be used with D-D or D-D-He$_3$ reactions. Temperatures above about 500 Kev are needed, e.g., with PLi$^6$ reactions. It will be appreciated that the energy of the particles injected must be correlated with the density of the plasma to obtain the desired reaction rate. Allowance must be made for energy supplied by charged reaction products and energy lost by radiation transfer, in the form of energetic charged and neutral particles extracted or escaping from the plasma and the like, in accord with well known reaction theory. High energy particles may be utilized more effectively in the present conversion system than with systems in which the kinetic energy of escaping particles is not recovered since the energy of the injected particles is recovered, in large part, on the average, along with energy added by the heated plasma and/or fusion reaction. Moreover, unreacted fuel materials and fuel materials and other products produced in the reaction may be recovered by processing the effluent from the vacuum pumping systems, described hereinafter.

One or more vacuum pumps 38 are connected, e.g., to vessel section 26, with cryogenic or gettering type pumping arrangements (not shown) being similarly connected or otherwise mounted within the vacuum chamber as appropriate to produce the requisite vacuum conditions therein, i.e., below about $10^{-6}$ mm Hg and preferably below about $10^{-8}$ mm Hg to below $10^{-10}$ mm Hg.

In operating the foregoing reactor an electrical current from an appropriate source (not shown) is applied to the coil segments 11 and 12 to produce a quadrupole minimum $|B|$ magnetic containment field within the generally spheroidal chamber 28.

The containment magnetic field pattern produced in chamber 28 has a minimum intensity at the center 41, thereof, and the magnetic field strength increases in all directions therefrom. Also, the magnetic field intensity $|B|$ along a set of nested ellipsoidal surface extending outwardly from the center is a constant and the magnetic field strength increases outwardly therealong defining a containment zone for charged particles or plasma therein. Moreover, the magnetic field lines passing through the last closed contour of $|B|$ are curved convexly toward the plasma containment zone providing a stable magnetic containment configuration. Also, these field lines leave the containment field zone configuration by passing near the sector conductors providing a high magnetic mirror ratio, i.e., $R_{||} = {}^B max/_{Bmin}$, indicating that the magnetic field gradient increases at a rapid rate providing for an enhanced reflection of charged particles back into the containment zone. It may be noted that a filamentary approximation of the coil 10 can be fully specified by the terms R, the outer radius of the arcuate segments 11, 12; $\phi$ the arcuate angle subtended by the segments 11, 12, wherein $\phi$ may be an angle in the range about 180° to about 270°; and h, the distance between a median plane between sectors 13a, 13b or 14a, 14b and the outside dimension of said sectors; and $\Delta Z$, the displacement along the Z-axis (axis 47 defined below), shown in FIG. 3, of the effective centers of the arcuate sectors of segments 11 and 12 which produces a variation in the magnetic mirror ratio $R_{||}$ over a range of at least 1.5 to 7.0. The magnetic field configuration produced by such a coil can be calculated using analytic approximations or using computers, for example, utilizing the "MAFCO" Code as disclosed in the above-cited application and publication of Post and Moir. The "MAFCO" Code is also disclosed in Report UCRL 7744 of the University of California Radiation Laboratory, Rev. II, 1966, authored by W. A. Perkins and J. C. Brown and is written in FORTRAN language suitable for computation with a wide variety of computers.

With one or more beams of energetic neutral particles injected from sources 31, as shown in FIG. 1, the injected neutral particles are ionized by collision with background gas particles or plasma and are thereby trapped by the magnetic field defining the containment zone so as to increase the plasma density therein. It is preferable to mount and arrange the sources, e.g., on vessel sections 27, so that the neutral particle beam crosses the field lines in order to enter the containment zone so that the neutral particles are ionized more efficiently, i.e., by a Lorentz force mechanism, to be ionized and trapped in the containment zone. In either case, a plasma body 42 capable of undergoing a fusion reaction is disposed in the aforesaid containment zone, as shown in FIG. 3. The plasma body 42 is shaped by the magnetic field pattern defining the containment zone into generally semi-circular or arcuate fan-shaped lobes 42a and 42b rotated 90° with respect to each other and joined along a common base plane. The plasma body 42 may be approximated by a spindle configuration divided along a plane passing through the spindle ends and with the halves rotated 90° with respect to each other. Another generally representative configuration would be of a short tube with the ends crimped together forming fan shaped lobes rotated 90° with respect to each other (not shown). The magnetic field pattern, passing near the sector conductors as described above, provide a fan-shaped region 43 between coil sectors 13a, 13b, as well as a similar region (not shown) between sectors 14a, 14b. The magnetic field lines converge in region 43 toward a median plane between sectors 13a, 13b, as well as toward a similar plane (not shown) between sectors 14a, 14b. It is into these convergent regions that the hemispindle-shaped plasma body portions intrude to afford the aforesaid fan-shaped lobes 42a and 42b. Plasma particle loss from the plasma occurs preferentially through the periphery of the fan-shaped lobes 42a, 42b, ordinarily forming a sheet-like fan-shaped plasma beam directed generally along said median planes between the respective coil lobe portions. With symmetrical magnetic field conditions the escape of plasma particles from lobes 42a and 42b is equally probable. To favor escape from lobe 42b, so that essentially all of the energetic particles escaping from the plasma body 42 appear in a narrow plasma beam 44, the current in segment 12 is increased over that of segment 11 so that the mirror field intensity between sectors 14a, 14b may be increased to more effectively reflect particles back into plasma body 42. Any other means of increasing the reflectivity of the mirror field region from which plasma loss is not desired may also be used. For example, positive potential electrodes (not shown) arranged in fringing field regions can be used to reflect positive ions back into the containment zone. A similar negatively charged electrode (also not shown) disposed outwardly from the positive electrode minimizes interference from electrons.

To modify magnet segment 11 to provide an appropriate outlet from the containment field for generating such a narrow plasma beam 44, the sectors 13a, 13b, of segment 11, may be bowed arcuately outwardly in corresponding regions 46a, 46b, to reduce the magnetic field intensity in the region therebetween. Due to this localized reduction in the magnetic field intensity the plasma beam 44 preferentially escapes therebetween a narrowly defined beam path. As shown in FIG. 2 the bowed regions 46a, 46b, are perpendicularly bisected by a plane of symmetry which also perpendicularly bisects the sectors 13a, 13b, as well as bisecting rectangular vessel section 26. Accordingly the beam 44 may be considered to emerge along an axis 47, coinciding with the Z-axis, mentioned above, defined by the intersection of the aforesaid plane of symmetry and a second plane of symmetry 48 located medially between sectors 13a, 13b, which axis also passes through the center 41 of the containment field pattern. Such an outlet can be provided at other locations along the arc of the C-shaped magnet coil segments or more than one such outlet, in the same segment and/or in the second segment can be used if necessary to accommodate the full plasma output of the reactor. It may be noted that the quantity of plasma escaping through such an outlet is proportional to the reduction in magnetic field intensity therein as can be computed from well known magnetic mirror field containment theory. For example, a reduction of about 10 percent in the magnetic field intensity in an outlet region, as compared to a normal intensity as exists elsewhere along the segment, will assure that about 90 percent of the escaping plasma particles will emerge from the outlet region. The beam width may range from as low as below about 1° to above about 15° dependent upon the acceptance angle of the collector system described more fully hereinafter. A flanged port 49 is provided in the end panel of rectangular vessel section 24 to provide an aperture in vessel 24 for emergence of plasma beam 44 from the reduced intensity peak field region provided by bowed coil portions 46a, 46b.

The plasma beam 44 will comprise energetic ions corresponding to fuel particles injected into the reactor, reaction product ions and ions of extraneous materials entering or purposely introduced into the reaction zone and escaping therefrom together with electrons. Ions such as $H^+$, $D^+$, $T^+$, $He_3^+$, $He_4^+$, $Li_6^+$ and ions of any other material introduced or formed in the containment zone carrying at least a significant fraction if not all of the recoverable kinetic energy may appear in the plasma beam. Moreover, the ions in the beam may have an energy distribution ranging from a few Kev to at least about 1.5 Mev dependent on plasma reaction temperature, ambipolar potential, $\phi$, energy of injected particle, etc. With magnetic mirror type reactors the minimum ion energy is usually determined by the ambipolar potential, i.e., of the order of 100–200 Kev. At least a major proportion of the particle kinetic energy is in the form of a rotational kinetic energy component, $W_\perp$, in the region 51 of reduced peak magnetic mirror field intensity between bowed regions 46a, 46b of sectors 13a, 13b, at which the ions escape from the containment field. The remainder is in the form of a translational energy component, $W\|$. To achieve maximum conversion efficiency the rotational energy component must be transformed into translational energy as described hereinafter.

EXPANDER

Figure 4:
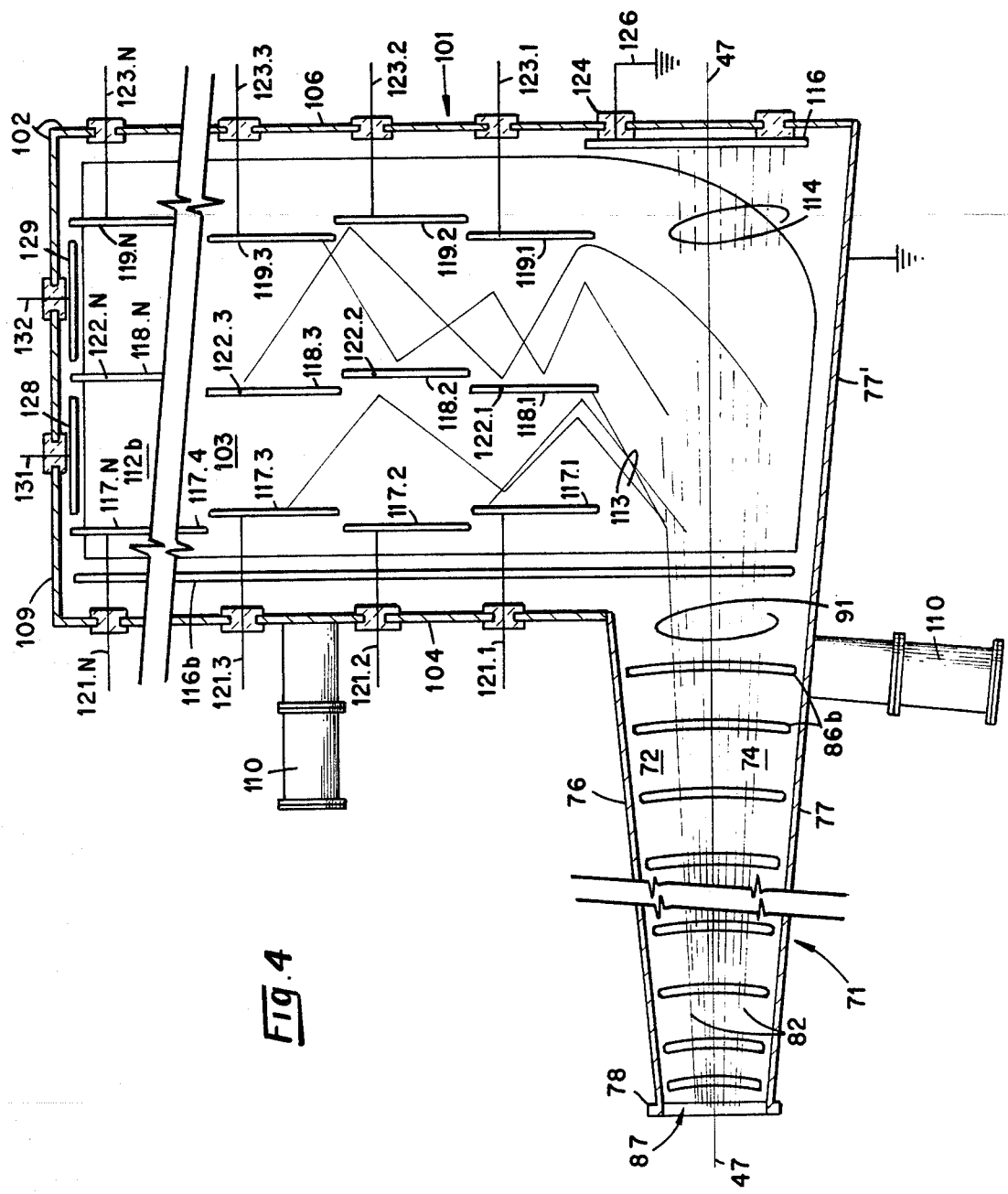
FIG. 4 is a horizontal sectional view taken along the plane 4—4 of FIG. 3 showing details of the expander and collector portions of the apparatus.

In order to transform the rotational energy component, $W\bot$, of the ions into translational kinetic energy, $W\|$, which would then represent the total kinetic energy of the particle, the plasma beam 44 is passed through an expander unit. The expander unit may be constructed within a generally arcuate sector vacuum vessel 71 defining a truncated arcuate section vacuum chamber 72 which is a radial extension of the portion of the reactor vacuum chamber included within rectangular vessel portion 24. More particularly, vessel 71, as shown in FIGS. 1, 3 and 4, includes top and bottom arcuate sector wall portions 73, 74, joined edgewise to vertical wall sections 76, 77, respectively. A flanged end portion 78 may be employed to join the expander vessel, at the entrance end thereof to the port 49 of vessel member 24.

The plasma beam 44 passes or is guided through the expander along an arcuate annular sector or semi-conical beam path 82 generally in the vicinity of a median plane 83 situated between the top and bottom walls 73, 74 of the expander vessel. Means are provided for establishing a magnetic field having, e.g., field lines 84, shown in FIG. 3, linking with those of the peak magnetic mirror field region 51 and extending radially through the expander vessel, symmetrically distributed with respect to said median plane 83. Such means may take the form of electrical conductors 86a, 86b, arranged substantially in matching pairs in spaced relation across the median plane 83. The conductors 86 are curved where beam divergence is substantial so that uniform arcuate magnetic field intensity contours exist along the annular width dimension of the expander vessel. For beams of low divergence the conductors may be straight. The conductors 86 may be individual conductors arranged at the ends for connection to an appropriate D.C. power source (not shown) or the conductors may be wound as a solenoid adapted to be connected to a D.C. power source (not shown) and in either case may be supported by insulators or insulating frameworks (not shown) mounted on the vessel walls.

The ampere turns distribution of the conductors is arranged to provide an expansion field intensity matching that of the peak magnetic mirror field region 51, typically of the order of 100 to 250 kilogauss, and providing a smooth magnetic field transition region at the entrance aperture 87 of the expander. The ampere turns distribution along the plasma beam path through the expander vessel is arranged so that the magnetic field intensity decreases progressively therealong to a low level, of the order of 300–700 gauss, 500 gauss typically, in the exit region 88 of the expander. These values assure transformation of at least about 99 percent of $W\bot$ to $W\|$ of the kinetic energy of the plasma beam 91 on emergence from the expander field. Where a lesser efficiency can be tolerated the terminal field value may have intensities of up to several thousand gauss.

With the lines passing through the progressively decreasing magnetic field region there occurs a transformation of the rotational energy component, $W\bot$, to translational, $W\|$, in accord with usual magnetic mirror theory. This transformation may be represented by the formula $$W\|(z) = W - W\bot(\theta)[B_{(z)}/B_{(o)}]$$

wherein $B_{(z)}$ = magnetic field intensity along the plane 83 in the expander, $B_{(o)}$ = field intensity at mirror peak, $W\| = $ *kinetic energy component parallel to field* and $W\bot = $ rotational kinetic energy component of the particle. When $B_{(z)} \gg B_{(o)}$, $W\|(z)$ approaches W, the total particle kinetic energy. Expansion to the point where $B_{(z)}/B_{(o)} = 10^{-2}$, for example, would assure that more than 99 percent of the particle kinetic energy would be translational kinetic energy. Also it may be noted that the density of the particles in the exit region of the expander has fallen to a very small fraction of that in the contained plasma body 42, i.e., typically by a factor of the order of $10^{-8}$ or less so that the beam particle fluxes will no longer be dominated by plasma behavior or space charge effects. The resultant densities in the exit region 88 of the expander will usually be of the order of $10^6$ particles/cc or less.

The magnetic field intensity, B, in the expander unit may be decreased in several ways. The magnetic field can be reduced progressively from the higher intensity, e.g., 150 kilogauss, at the inlet aperture to the lower level of about 6 kilogauss in a matter of 10 to 15 meters and then in a matter of a few more meters to a lower level, e.g., 450–500 gauss, prevailing through most of the expander, about 75 meters of path a plasma beam 91 emerges at the exit of the expander. B may also be decreased as indicated by the equation $B \propto 1/R$ where R is the radius location within the expander vessel. In this case B may be decreased progressively, requiring about 10 meters of beam path length to reduce B by an order of magnitude.

EXAMPLE I

Illustrative parameters for a fusion reactor plasma-expander unit suitable for producing a plasma beam 91 adapted for producing electrical energy in the collector system of the invention as described hereinafter are set forth as follows:

| | |
|---|---|
| Fusion reactor plasma source (Yin-Yang coil or Baseball Seam electromagnetic field coil type) | |
| Reaction chamber diameter | 3–4 meters |
| Plasma volume | ≈20–30 m.³ |
| Minimum field intensity $B_o$ at center of containment zone with plasma | ≈ 50 kilogauss |
| Maximum field intensity, $B_{max}$, at mirror peak (edge of containment field) | 150 kilogauss |
| Mirror ratio $B_{max}/B_o$ operating | 3:1 |
| Mirror ratio $B_{max}/B_o$ initial | 2:1 |
| Ratio of magnetic field pressure to plasma pressure | $\beta = 0.5$ |
| Fusion fuel | Deuterium with 20% He$_3$ |
| Injected fusion fuel particle energy | 500 Kev (D) |
| Reactor plasma density | ≈ $10^{14}$ particles/cc |
| Plasma temperature (mean particle energy) | 600 Kev |
| Power output of fusion reactor plasma source | 1000 MW(e) |
| Plasma beam particle energy distribution | 200 Kev to about 1.5 Mev |
| Inner radius dimension of expander chamber | ≈ 4–5 meters |
| Outer radius of expander chamber | ≈ 100 meters |
| Field intensity at inner radius of expander vessel (peak of mirror field) | 150 kilogauss |
| Thickness of plasma beam at entrance of expander (2h) | ≈ 10 cm |
| Magnetic field intensity at exit of expander | ≈ 500 gauss |
| Plasma beam thickness at expander exit (2h) | 1 meter |
| Power in beam at expander inlet | ≈ 1000 MW(e) |
| Power output (theoretical) | ≈ $1.2 \times 10^3$ amps at 800 kolovolts |
| Current density at expander exit | ≈ 4000 μamp cm² |
| Space charge limited density at expander exit (edge of beam) | ≈ $2.6 \times 10^7$ cm³ |
| Outward directed electric field (edge of beam) | ≈ 250 v/cm |
| Potential difference between midplane of beam and edge | ≈ 6 kilovolts |
| Ratio $W\|/W\bot$ at exit of expander | 0.005 |

COLLECTOR-ELECTRICAL CURRENT GENERATION

The plasma beam 91 comprising one or more energetic ionic species of varying kinetic energies derived as described above, together with energetic electrons emerges from the expander in the vicinity of plane 83 along arcuate sector beam path 82. For converting the kinetic energy of the ions therein directly into electrical energy, the ions are diverted angularly away from the electrons in the beam path 82 to enter a collector system, embodiment 101, as an ion beam 91 substantially devoid of electrons as shown in FIG. 4 of the drawing to successively approach a series of collector electrodes maintained at progressively decreased retarding potentials. Ions having a kinetic energy of a magnitude sufficient to overcome the retarding potential of a particular electrode impinge upon the collector whereat the ions combine with electrons to generate electrical current at the potential of the electrode. The ions having a kinetic energy inadequate to overcome the retarding field of a particular electrode proceeds successively along the series of collector electrodes until one having a retarding potential at least slightly less than the kinetic energy of the ion whereat the ion is collected, as above, to generate electrical current. In this fashion the ions of varied kinetic energy are, in effect, sorted out and collected to produce an electrical current at a potential only a little below the equivalent kinetic energy thereof. The losses incidental to collection can thereby be reduced to as low a level as desired by utilizing more stages and decreasing the potential increments between stages.

More particularly, a first embodiment 101 of the collector system is constructed within a vacuum vessel 102 as a generally rectangular offset extension of the expander vessel 71 and defining a vacuum chamber portion 103 intercommunicating with expander chamber 72. The vacuum vessel 102 may be constructed by extending expander vessel sidewall 77 to provide endwall 77' of the collector vessel which also may include top and bottom walls 107, 108 joined at one end to wall 77' and extending transversely across beam path 82 generally parallel to plane 83 with a second endwall 109 joining the other ends thereof. A truncated sidewall 104 may be joined edgewise to one side of the top and bottom walls 107, 108 and end wall 109 as well as sidewall 76 of the expander vessel leaving an aperture, e.g., defining the exit region 88 of expander as an aperture for entry of the beam path into chamber 101. A sidewall 106 may be used to close the remaining side of the collector vessel.

The beam path 82, traversed by plasma beam 91, accordingly extends transversely across one end of the collector vessel which may be designated the entrance region of the collector as well as constituting a transition region between the expander and collector system. The height of the collector vessel may generally be made greater than that of the expander vessel, as shown, to better accommodate components of the collector system. Means such as vacuum pumps 110 may be connected to the expander and collector vessels to establish a requisite vacuum pressure therein, i.e., below about $10^{-5}$ mm Hg and preferably below about $10^{-6}$ or $10^{-7}$ mm Hg.

In accordance with the invention, means are provided for creating a suitably oriented E × B field in the aforesaid transition or entrance region of the collector vessel as well as in offset portions of the collector chamber 103 for diverting energetic ions away from plasma beam 91 longitudinally through chamber 103. For convenience diversion in about a 90° angle may be used. Diversion in greater or lesser angles is feasible but usually requires more complicated field patterns. The magnetic component, B, of such field may be created by disposing parallel arrays of electromagnet conductors 111a, 111b, extending longitudinally proximate top and bottom walls 107, 108 of the collector vessel 102 in spaced relation across plane 83 and transversely across beam path 82 so that the B-field vector, $\vec{B}$, is generally parallel to the axis 47 of beam 91. In the transition region the B-field may be considered to be an extension of the expander field effective to guide charged particles along the beam path. The conductors 111a, 111b, may be supported by frameworks carried by the vessel walls (not shown) and may be energized by means of a direct current supply (not shown) to establish a substantially uniform B-field in the transition and offset regions of chamber 103.

The electrostatic component, E, of the E × B field may be provided by magnetically permeable plate or grid electrodes 112a, 112b, disposed inwardly of conductors 111a, 111b, respectively, in spaced parallel relation across plane 83 in the transition and offset portions of collector chamber 103. An electrostatic potential applied between electrodes 112a, 112b, from a direct current power supply (not shown) applied through conductor terminals 115a, 115b, creates the E-field. With electrode 112a, made positive and 112b made negative, the electric field potential vector is directed in the downward direction as shown in FIG. 3, so that the slower moving positive particles undergo an E × B drift and are diverted away from the plasma beam into chamber 103 while the faster moving electrons continue along beam path 82 as a residual beam 114. A plate collector electrode 116 is disposed transversely across the path of electron beam 114 to collect such electrons and remove them from the vacuum chamber as by grounding electrode 116. Electrode 116 may be provided with high transmissivity grids (not shown) mounted on the inner face thereof to suppress secondary electron emission as may other collector electrodes described elsewhere herein. The electron component of the plasma beam 82 possesses kinetic energy which could be recovered in a suitable collector system in a manner analagous to the ionic energy; however, the kinetic energy of the electron component derived, e.g., from a magnetic mirror device is generally of a relatively low magnitude — not usually economically feasible to recover.

The collector system 101 within the offset portion of the collector vessel 102 comprises a plurality of stages in the form of parallel rows of collector electrodes arranged in staggered relation longitudinally within said collector vessel. In embodiment 101, shown in FIG. IV three rows of such collector electrodes are shown, i.e., 117.1, 117.2 ... 117.N; 118.1, 118.2 ... 118.N; and 119.1, 119.2 ... 119.N in which the electrodes are arranged in staggered overlapping spaced relation. The leading edges of electrodes 117.1, 118.1 and 119.1 are disposed proximate the edge of beam path 82 but with sufficient spacing or with negatively polarized grids (not shown) situated therebetween to avoid impingement of electrons from the plasma beam thereon. Moreover, the collector electrodes of said rows are disposed in the space between E-field electrodes 112a, 112b, and perpendicular to said electrodes 112a, 112b, defining channels therebetween extending longitudinally of chamber 103. The collector electrodes may be supported by insulating spacers carried by plate electrodes 112a, 112b, and/or by supporting insulator frameworks attached to the vessel walls (not shown). Retarding potentials may be applied to such electrodes 117, 118 and 119 and the electrical current generated therein may be withdrawn, as described more fully hereinafter, by means of terminal conductors 121.1 ... 121.N; 122.1 ... 122.N; and 123.1 ... 123.N, respectively, connected thereto. The terminals are brought outside of the walls of vessel 102 as through feedthrough insulator seals 124, as may grounded terminal 126 of electron collector electrode 116.

The electrodes disposed in opposing rows in said collector system are provided with positive retarding potentials beginning with a potential, of a magnitude selected to repel all of the ions or to admit only a selected high energy range fraction of ions, applied to the first electrode 118.1 and/or 119.1, of the second and third rows of collector electrodes. Progressively lower retarding potentials are then applied to successive collector electrodes disposed in alternating opposing relation across said channels. For example, progressively decreased potentials may be applied to electrodes 118.1, 117.1, 118.2, 117.2, ... 118.N, 117.N. Likewise, progressively decreased potentials can be applied to electrodes 119.1, 118.1, 119.2, 118.2 ... 119.N and 118.N.

With the foregoing arrangement as the plasma beam 91 enters the entrance or transition region of the collector system the positive ions subjected to the E × B field begin an E × B drift away from beam path 82 into the channels between said rows of collector electrodes. The electrons drift very little in the × (cross) direction and impinge upon collector plate 116 for disposition as indicated above. The energetic ions, which travel at much lower velocities than the electrons due to their greater mass, are subjected to the E × B field for longer times, inversely proportional to energy, and therefore experience a much greater drift, i.e., sufficient to be diverted from beam path 82 and directed toward a first higher retarding potential electrode of said collector system at the entrance of one of said channels. Such an ion will move parallel to the B-field with a velocity $V_{||} = \sqrt{2W_{ion}/M}$ and with a perpendicular velocity $V\perp = E/B$ where
$W_{ion}$ = kinetic energy of ion
$M$ = mass of ion
$E$ = electric field potential
$B$ = magnetic field intensity As a particular ion approaches such first collector electrode, e.g., electrode 118.1 or 119.1, the ion is reflected therefrom with undiminished energy if of lower energy than is required to overcome the retarding potential. However, if the ion is of sufficiently higher energy, it overcomes the retarding potential and impinges on the collector to combine with an electron thereby generating electrical current at the potential of the particular electrode. The ions reflected at a particular electrode are directed across the collector to approach a second lower potential electrode where a similar selection occurs and the lower energy ions rebound in a zig-zag path across said channel to sample progressively lower retarding potential electrodes until one is selected having a retarding potential at least slightly less than the equivalent energy thereof at which the ion is consequently collected. The neutral atom or molecular species formed by combination of the ions with electrons at the collector electrodes remain embedded in the electrode or form gas which is removed by evacuation means such as vacuum pump 110. If augmented evacuation is required, sublimation, ion, gettering, cryogenic or other high speed vacuum pumping means (not shown) may be provided in or be connected to collector vessel 102. Low energy ions arriving at the lower potential collector end of the collector system may be collected by means of plate collector electrodes 128, 129, disposed transversely across the channels between the retarding electrode rows. A retarding potential, which may be the lowest progressively decreased potential of the system may be applied by means of terminals 131, 132, connected to electrodes 128, 129 and brought outside vessel 102 through insulators 124, to generate the lowest recoverable potential of the system. The electrodes 128, 129 could also be grounded or polarized slightly negatively to serve as a "-beam dump" to dispose of excessively low energy or extraneous ions if the energy content thereof is of a negligible magnitude.

The number of collector electrode stages employed in the aforesaid zig-zag pattern is determined by the range of ion energies in the ion beam and the conversion efficiency desired and, e.g., may range from about 5 to above about 30. The retarding potential increments between stages is similarly determinable and might range from as low as about 15 kilovolts (Kv) per stage to as high as about 100 Kv with narrow and wide ion energy spreads, respectively. With an energy spread of the order of 500 Kev to 1.5 Mev from about 10 to about 30 stages with potential increments of the order of 15–50 Kv could be used in typical practical systems.

The distance a particular ion drifts along the X direction ($X_d$) in the collector system channels is indicated by the following relation $$X_d = (2 \, V\perp)/(V_{||}) \, L$$

where $L$ is the longitudinal spacing between successive collector stages. As the foregoing relation indicates $X_d$ varies and therefore the collector electrode plates must be varied in longitudinal width to assure that particles of the selected energy range impinge upon the appropriate electrode. Generally speaking the electrode plates must be increased in width in proceeding from the high potential to the low collection potential end of the collector system, and Xw, electrode width must equal or exceed $X_d$ for particular mean ion energies to be collected principally thereat.

Once the retarding potentials, Vi, are selected the efficiency of energy conversion $\eta(W_{ion})$ can be approximated since $$\eta(W_{ion}) = 1 - \frac{W_{ion} - Vi}{W_{ion}} = \frac{Vi}{W_{ion}}$$

where $W_{ion}$ is the kinetic energy of the ion. The total efficiency, $\eta$, depends on the distribution of ion energies $f(W_{ion})$ as $$\eta = \frac{\int_0^\infty \eta(W_{ion}) W_{ion} f(W_{ion}) dW_{ion}}{\int_0^\infty W_{ion} f(W_{ion}) dW_{ion}}$$

EXAMPLE I

The following parameters are illustrative of those that can be used with a collector system of the type hereinbefore described.

| | |
|---|---|
| Beam width at entrance to collector | 1 meter |
| Beam ion energies ($D^+$, $He_3^+$, $He_4^+$, $P^+$, etc.) | ≈ 200 Kev to 1.5 Mev |
| Beam ion energies (mean) | ≈ 600 Kev |
| Incremental voltage decrease per stage | 60 KV |
| Number of stages | 20 |
| Beam thickness in collector stages | 1 meter |
| Aperture between electrode plates | 10 meters |
| Collector electrode width | ≈ 0.5 to 2 meters |

Figure 6:
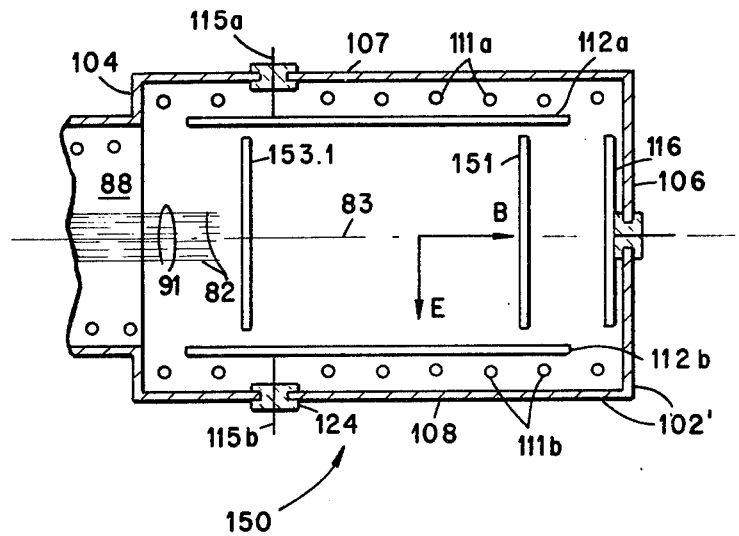
FIG. 6, is a cross-sectional view taken along a vertical plane of entrance portions of the collector portion of the apparatus of FIG. 5 corresponding to a similar region in the apparatus of FIG. 4.

A second embodiment 150 of a current generating collector system of the invention is illustrated in FIGS. 5 and 6 of the drawing wherein elements similar to that of the first embodiment, 101, are indicated by corresponding reference characters. In embodiment 150, the center row of electrodes 118.1 . . . 118.N is eliminated and one elongated retarding potential plate electrode 151 is substituted for the row of electrodes 119.1, . . . 119.N. A terminal conductor 152 is connected to electrode 151 and lead exteriorly of vessel 102 for application of a retarding potential thereto. A row of collector plate electrodes 153.1, 153.2, . . . 153.N, are arranged similarly to electrodes 117.1, 117.2, . . . 117.N, but with terminals 154.1, 154.2, . . . 154.N, led exteriorly of vessel 102 for application of progressively decreased retarding potentials respectively thereto as well as for conducting the generated electrical current therefrom as disclosed hereinafter.

In collector embodiment 150, collector electrode 151 is generally operated with a retarding potential of sufficient magnitude to repel substantially all of the ions in ion beam 113' diverted from ion beam 91 by the E × B field. However, it is conceivable that the retarding voltage thereof could be selected at a lower level at which a high energy fraction of ions could be collected to generate electrical current thereat. The potentials applied to electrodes 153.1, 153.2, . . . 153.N are progressively diminished from that applied to electrode 151.

In the usual mode of operation the ions of beam 113' are reflected by the retarding field of electrode 151 toward electrode plate 153.1 which, has applied thereto a retarding potential of a lower magnitude selected to admit a chosen fraction of high energy ions to impinge upon the collector plate and generate electrical current as above. The ions repelled and reflected by the retarding potential applied to electrode 153.1 approach electrode 151 to rebound therefrom to approach collector electrode 153.2 whereat a second lower energy fraction is collected and current is generated. The foregoing process is repeated successively at each of the collector electrodes so that in effect the ions in ion beam 113 are sorted out and collected at an electrode having a retarding potential only slightly lower than the equivalent energy thereof for efficient generation of electrical current as above. Residual ions may be collected or disposed of by a single transverse collector plate electrode 156 fitted with a terminal conductor 157, as above, and disposed transversely across the second end of vessel 102.

In each of the collector system embodiments described above the collectors are shown as being offset to one side of the beam path. However, if desired, e.g., to accommodate higher operating power, etc., a similar system could be disposed symmetrically offset on the opposite side of the beam path. In order to provide an E × B drift in the opposite direction, the E-field electrodes could be divided in the midplane, i.e., substantially along the beam axis and the polarity of the E-field potential on the divided electrodes reversed. Moreover, at least one and up to several, e.g., 2 or three successive arrays of collectors can be positioned on each side of the beam path. Moreover several beam outlets can be provided from the reactor and additional expander-collector systems arranged as above to produce electrical current thereat. While a particular reactor has been described for purposes of illustration it will be appreciated that a collimated beam having a range of ion energies or even electron beams and negative ion beams can be treated similarly by utilizing negative retarding potentials.

EXAMPLE II

| | |
|---|---|
| Beam width at collector entrance | 1 meter |
| Beam thickness in collector stages | 1 meter |
| Beam ion energies ($D^+$, $He_3^+$, $He_4^+$, $P^+$, etc.) | ≈ 200 Kev to 1.5 Mev |
| Beam ion energy (mean) | 600 Kev |
| Incremental retarding potential per stage | 60 Kv |
| Number of collector stages | 20 |
| Transverse electrode spacing | 10 meters |
| Collector electrode width (progressive) | 0.5 to 2.0 meters |
| Collector electrode height | 1.5 meters |

ELECTRICAL ENERGY OUTPUT-RETARDING POTENTIAL POWER SUPPLY CIRCUITRY

The electrical energy delivered by the various collector stages is in the form of direct current (D.C.) electrical power in which the voltage delivered ranges from that of the first stage (---.1) to that of the last (---.Nth) stage. The lowest voltage limit will, in general, be determined by some operating parameter of the plasma, i.e., fusion reactor. Characteristically, the lower voltage limit may be determined by the plasma potential, i.e., ambipolar potential. Such may range from about 100 kilovolts to about 200 kilovolts in open-ended or magnetic mirror devices and is effective to accelerate ions to equivalent energies which ions emerge from the plasma containment zone as a relatively low energy component of the plasma beam. The electrons emerge from such a system with low energies but in other systems the electrons may carry considerable energy in which case the electron component may be treated similarly. The higher voltage limit is determined by the statistical spread of the ion energies in the plasma, plasma reaction temperature, etc. For example, with a reaction plasma temperature of 600 Kev, a significant proportion of the ions in the plasma may have an energy of the order of at least 1 Mev to as high as 1.5 Mev and appear in the plasma beam. For most efficient recovery it is apparent, from considerations noted hereinbefore, that the ions must be collected near their natural potential, i.e., the particular collector electrode at which the ions are collected, must have a retarding potential of a magnitude at which the ions are slowed substantially to a stop. In practice, with a few hundred Kev spread, the retarding potential increments may be of the order of about 5 kilovolts to about 15 kilovolts with 10 kilovolts being a reasonable increment. With a wide spread of energies, e.g., 200 Kev to 1.5 Mev, wider voltage increments, e.g., up to 30–50 Kev or even as high as 100 Kev and fewer stages may be used with a correlative decrease in collection efficiency. Moreover, the upper and lower retarding potential limits may be selected to cover a practical range taking into consideration the number of collector stages required. For example, the number of stages may range from a minimum of about 20, i.e., $N = 20$, to about 50, i.e., $N = 50$, as determined by efficiency and construction economics, respectively.

Figure 7:
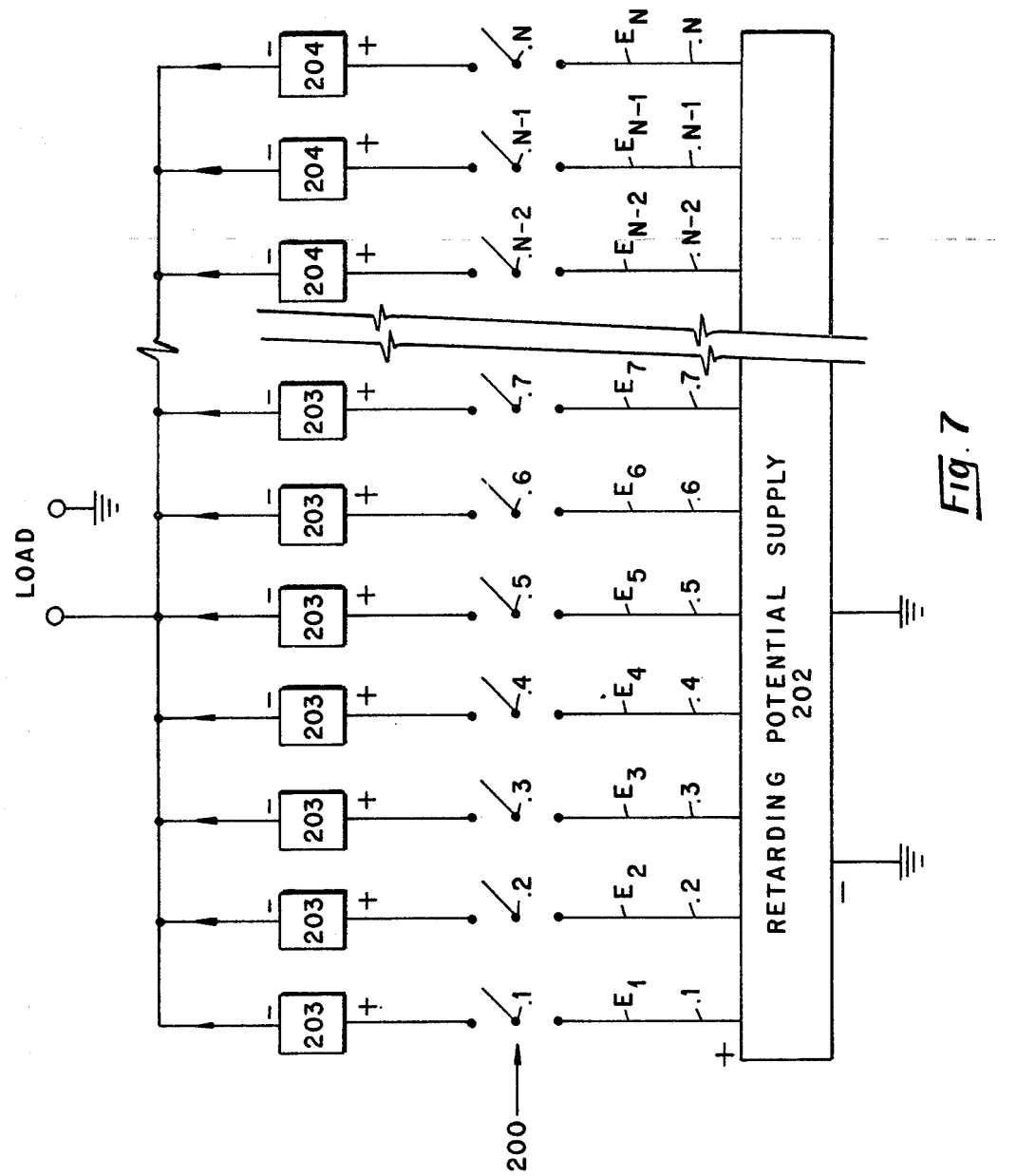
FIG. 7, is a schematic illustration of circuitry for applying retarding potentials to and removing electrical energy from collector electrodes of the disclosed collector systems.

Circuitry for applying the incremental retarding potentials to the sequential stages of the respective collector embodiments, disclosed above, is shown in FIG. 7 of the drawing. More particularly, terminal leads 122.1, 121.1, 122.2, 121.2, . . . 122.N and 121.N, of electrode 118.1, . . . 118.N, and 117.1, . . . 117.N, respectively, may be connected to switching contacts .1, .2, .3, . . . N., of a gang single pole double throw switching means 200 shown in FIG. 7. Terminals 123.1, 123.2, . . . 123.N, may be parallel with terminals 117.1, 117.2, . . . 117.N, or if desired a second switching means-power supply arrangement (not shown) could be used. For the second embodiment, terminal 152 of the electrode 151 could be connected to switch contact .1, and terminals 154.1, 154.2, . . . 154.N, of collectors 153.1, 153.2, . . . 153.N may be connected to contacts .2, .3, et. seq., of switching means 200. If desired to recover energy from collector electrodes 128, 129 or 156, the terminals 131, 132, or 157 may be connected to the last terminal N otherwise such terminals may be grounded or connected to a low negative potential to eliminate residual low energy ions and avoid space charge buildup at the second end of the collector vessel.

On startup, the gang switching means is switched to apply the retarding potential increment to said successive collector stages beginning with the maximum E, at contact .1. However, as current collection begins, the switching means is actuated to switch the movable gang switch contacts to connect the collector stages to corresponding output terminals. The output terminals may be connected to supply the collected current to means appropriate for converting the several currents at different voltages produced by the collectors to a single voltage, $\overline{V}$, electrical output current suitable for delivery to an electrical distribution or utilization system of conventional design.

For example, if such distribution system is a high voltage DC distribution system, all collectors delivering a voltage less than the DC voltage $\overline{V}$ of the distribution system are connected to a series of converter-rectifier units 203. Units 203 include converter circuitry which raises the voltage of the power supplied by each of the lower voltage collectors to the common output level $\overline{V}$ together with a rectifier which reconverts such power to direct current at the same voltage. In the case of collectors delivering a power output at a voltage higher than the common output voltage, $\overline{V}$, the output of the collector is passed through a converter-rectifier unit 204. The unit 204 may include a converter circuit which converts the direct current of the collector output to a varying current which is then passed through a stepdown transformer and a rectifier to deliver the output at said common output voltage $\overline{V}$. It is preferred that multiphase converter-rectifier equipment, well known in the art, be used for the foregoing purpose since a substantially constant current-constant-voltage, i.e., nonvarying potential relation, will then prevail at the collectors. With single phase half-wave or full-wave rectifier or converter equipment the voltage at the collector would vary, resulting in disturbance of the collector voltage and collection of ions. By omitting the rectifiers of the stages a common alternating current output voltage would be produced, if desired.

The total power output, P, of the collector system will, of course, be the sum of the product of the retarding voltage, i.e., operating voltage $E_s$ of each stage with the output current, $I_s$, thereof, i.e., $$P = \Sigma\,(E_s I_s).$$

This value will differ from the total power delivered to the distribution system only by the small losses introduced by the converter-rectifier system which can be as low as about 1 percent.

While there has been described in the foregoing what may be considered to be preferred embodiments, modifications may be made therein within the skill of the art and it is intended to cover all such as fall within the scope of the appended claims.

What I claim is:

1. Apparatus for the direct conversion of the kinetic energy of energetic charged particles into electrical energy comprising in combination:
    means for producing a high temperature plasma beam of energetic positive ions and electrons directed along a defined beam path;
    collector means including a plurality of collector electrode stages disposed in a region offset from said beam path, said electrode stages being arrayed in spaced sequential relation to define at least one channel therebetween extending angularly away from a location proximate one side of said beam path into said offset region, said sequential electrodes being provided with terminal means for application of retarding electrical potentials thereto which are decreased in progressive increments alternately from side to side of said channel away from said beam path as well as for with-drawal of electrical current generated at said electrodes; and means for establishing an E × B field, i.e., crossed electric and magnetic fields, in at least the region of said beam path proximate the higher potential electrodes as well as in said offset region for diverting ions away from the electrons remaining in said plasma beam into said channel wherein the ions are caused to follow a substantially zigzag path along said channel to sequentially approach said electrodes and be collected at one having a retarding potential lower than the equivalent energy of the ion to generate electrical current thereat.

2. Apparatus as defined in claim 1 wherein said means for producing a plasma beam comprises a controlled fusion reactor means employing a magnetic containment field and wherein said plasma beam is discharged through a defined region of said magnetic field wherefore the energetic ions have a component of rotational kinetic energy, $W\perp$, as well as a translational component of kinetic energy, $W\parallel$, directed along said beam path; and expander means providing a progressively decreased magnetic field along the path of said plasma beam so that the rotational kinetic energy, $W\perp$, of said ions is converted into translational energy, $W\parallel$, directed along said beam path, said B-field in the region of said beam path constituting an extension of the magnetic field of said expander means.

3. Apparatus as defined in claim 2 wherein a collector electrode is arranged to intercept the electrons remaining in the plasma beam traveling along said beam path.

4. Apparatus as defined in claim 2 wherein said controlled fusion reactor means comprises a Yin-Yang electromagnet coil system in the form of a pair of C-shaped coil segments each comprising a pair of spaced coextensive sectors joined by transverse curved end portions, said coil segments being arranged in mirror image 90° rotated intermeshing relationship to define a generally spheroidal central volume in which a quadrupole minimum B magnetic containment field is generated by said coil system, corresponding portions of the sectors of one of said coil segments being proportional to create a magnetic mirror field of decreased intensity therebetween through which said plasma beam is discharged along said beam path; and means for introducing, forming and trapping energetic fusionable light nuclide ions into said containment field to create a high temperature plasma therein.

5. Apparatus as defined in claim 4 wherein said fusionable light nuclide ions comprise at least one material selected from the group consisting of P, D, T, $He_3$ and $Li^6$ and the plasma temperature in the range of about 30 Kev to above about 700 Kev.

6. Apparatus as defined in claim 4 including vacuum vessel means enclosing the region occupied by said containment field with intercommunicating extensions thereof enclosing the beam path through the expander means as well as said collector stages; and vacuum pumping means for evacuating the region of said vacuum vessel means occupied by said containment field to below about $10^{-6}$ mm Hg and the extensions thereof to a pressure below about $10^{-5}$ mm Hg.

7. Apparatus as defined in claim 4 including a retarding potential power supply together with means for converting electrical current generated in said collector electrode stages into a form adapted for delivery to a distribution system, and switching the retarding potential power supply to connect with said collector stages and to connect said collector stages to said means for converting electrical current for delivery to said distribution system.

8. Apparatus as defined in claim 4 wherein said means for creating an E × B field comprises planar electrodes disposed in parallel spaced relation across said beam path and collector system and energizable with an electric potential to create an electric field with a vector, $E$, perpendicular to said beam path and channel defined by said electrodes together with electromagnet conductors disposed outwardly of said planar electrodes for establishing a B-field in the direction of said beam path and transverse to said channel.

9. Apparatus as defined in claim 8 wherein the collector stage electrodes comprise plate electrodes disposed in a row along each side of said channel.

10. Apparatus as defined in claim 8 wherein the collector stage electrodes comprise an elongated plate electrode disposed along the side of said channel, disposed furthermost along said beam path and to which the highest retarding potential is applied, together with a series of plate electrodes disposed in a row on the opposite side of said channel to which said progressively decreased retarding potential is applied.

* * * * *